Feb. 21, 1956   H. A McMASTER ET AL   2,735,331
APPARATUS FOR OPTICAL INSPECTION OF GLASS SHEETS
Filed May 2, 1949                              6 Sheets-Sheet 1
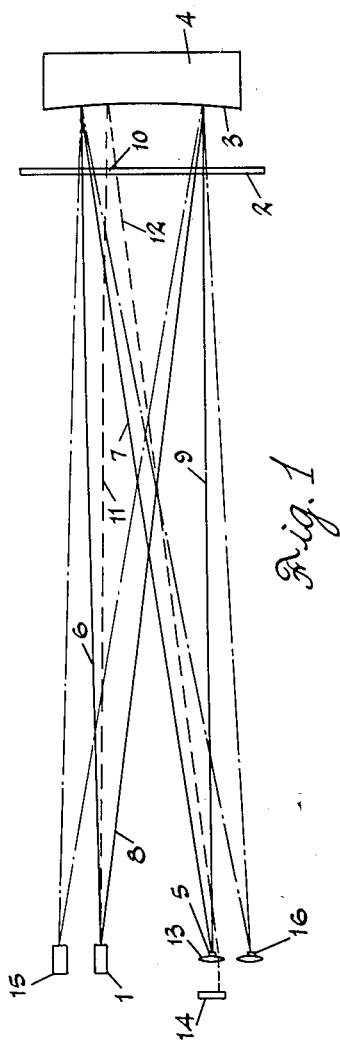
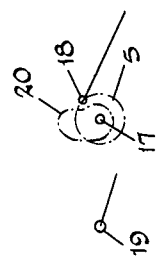
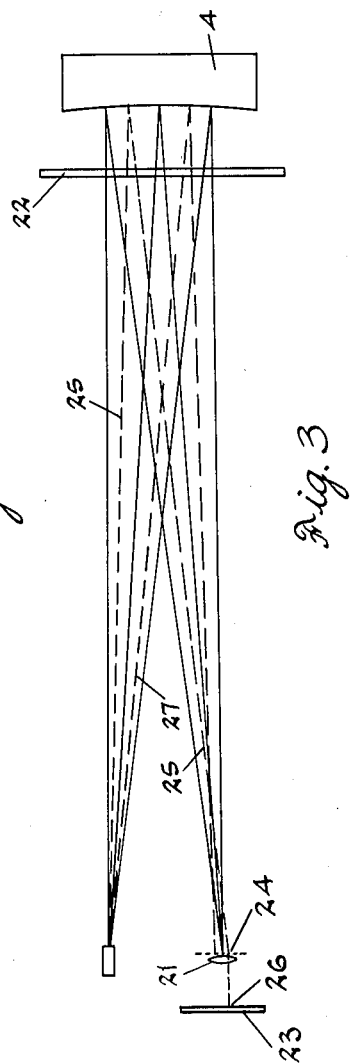
INVENTORS
Harold A. McMaster and
BY Roy W. Wampler
Nobbe & Swope
ATTORNEYS Feb. 21, 1956   H. A. McMASTER ET AL   2,735,331
APPARATUS FOR OPTICAL INSPECTION OF GLASS SHEETS
Filed May 2, 1949   6 Sheets-Sheet 2

INVENTORS
Harold A. McMaster and
BY Roy W. Wampler
Nobbe & Swope
ATTORNEYS

Feb. 21, 1956     H. A. McMASTER ET AL     2,735,331
APPARATUS FOR OPTICAL INSPECTION OF GLASS SHEETS
Filed May 2, 1949     6 Sheets-Sheet 3

INVENTORS
Harold A. McMaster and
BY Roy W. Wampler
Nobbe & Swope
ATTORNEYS

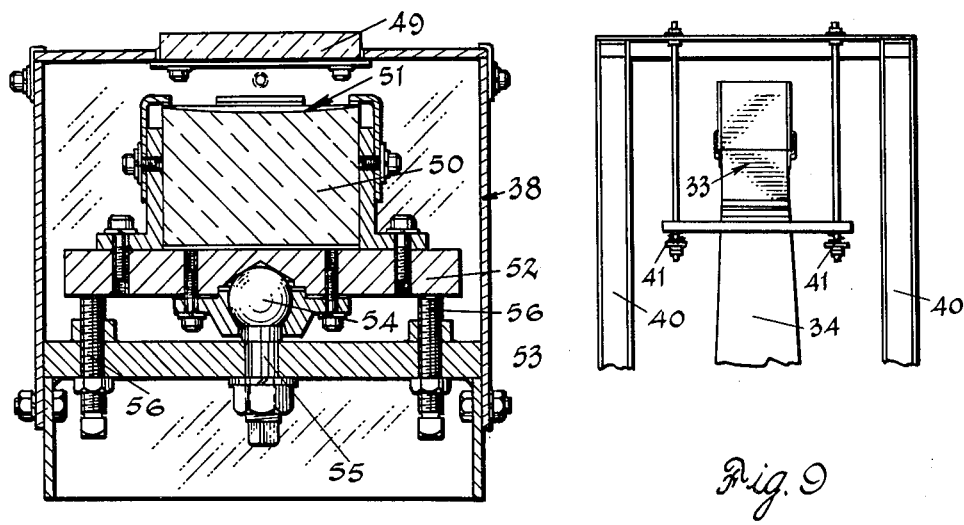
Fig. 8
Fig. 9
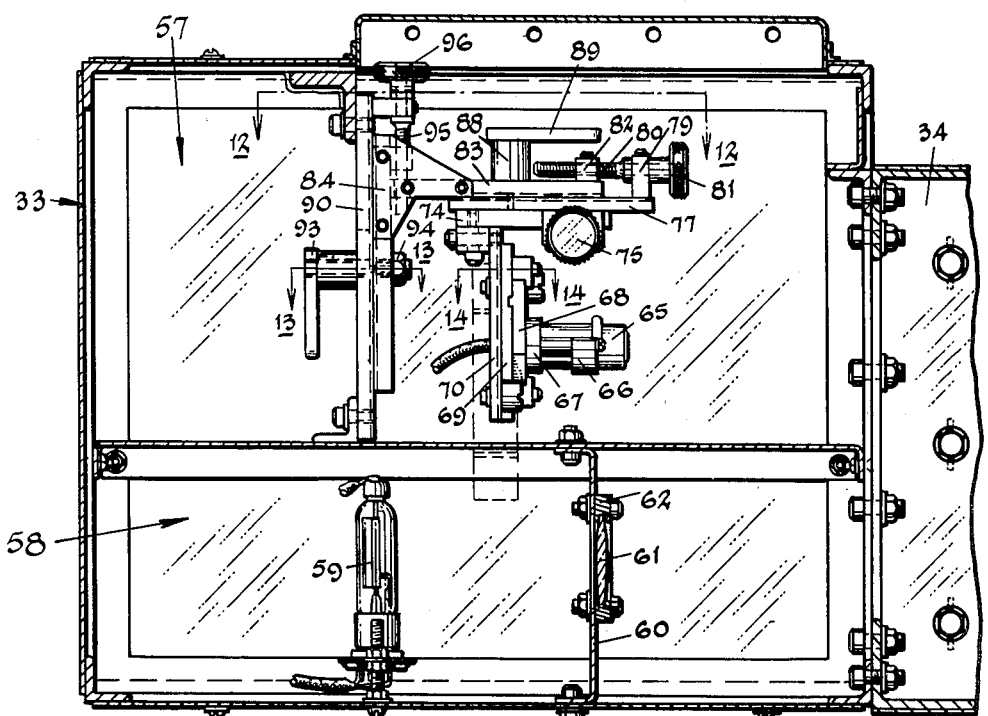
Fig. 10
INVENTORS
Harold A. McMaster and
BY Roy W. Wampler
Nobbe & Swope
ATTORNEYS Feb. 21, 1956   H. A. McMASTER ET AL   2,735,331
APPARATUS FOR OPTICAL INSPECTION OF GLASS SHEETS
Filed May 2, 1949   6 Sheets-Sheet 5

INVENTORS
Harold A. McMaster and
BY Roy W. Wampler
Nobbe & Swope
ATTORNEYS

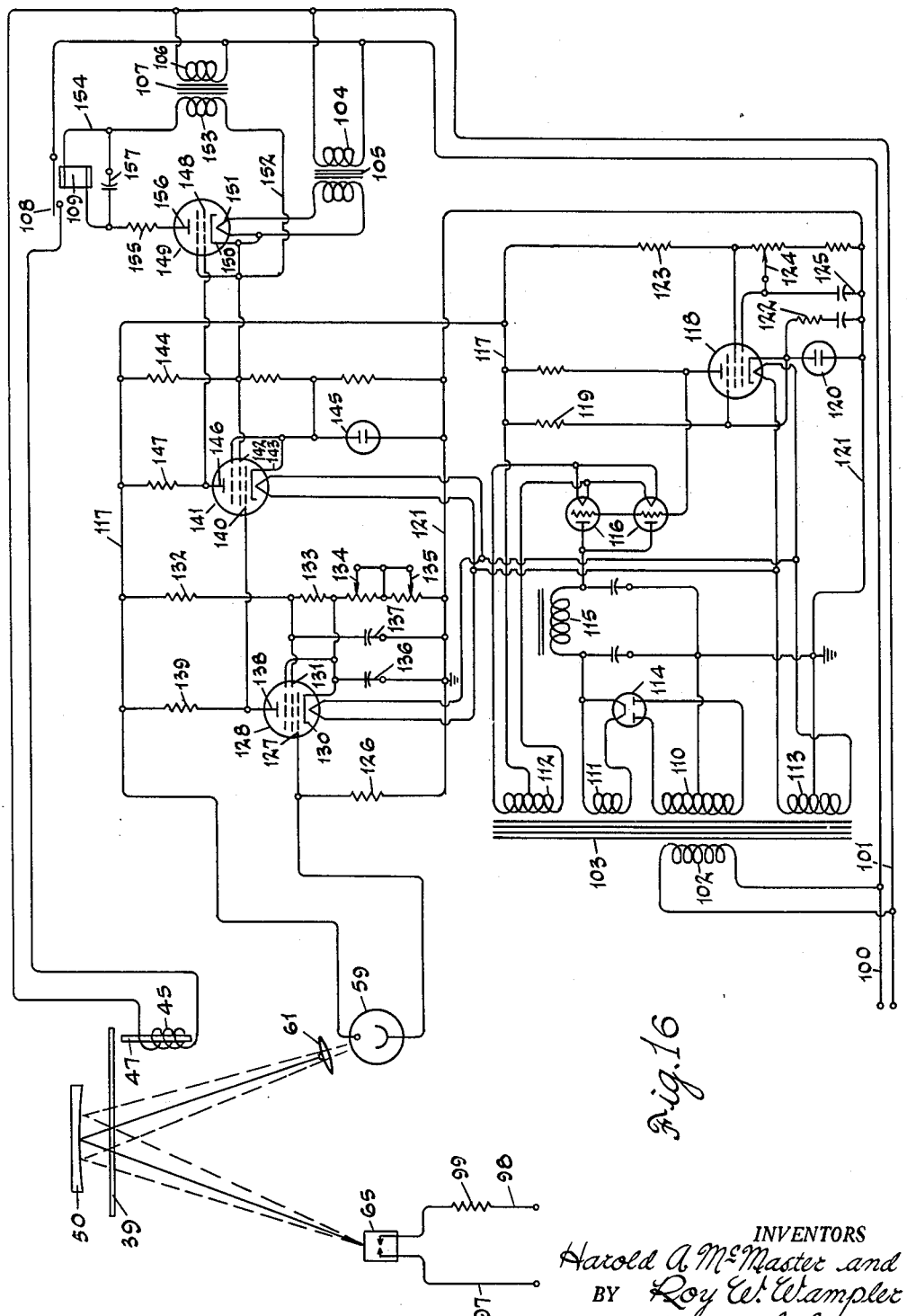

United States Patent Office 2,735,331
Patented Feb. 21, 1956

2,735,331

APPARATUS FOR OPTICAL INSPECTION OF GLASS SHEETS

Harold A. McMaster, Genoa, and Roy W. Wampler, Toledo, Ohio, assignors to Libbey-Owens-Ford Glass Company, Toledo, Ohio, a corporation of Ohio Continuation of application Serial No. 90,806, May 2, 1949 and forfeited. This application February 15, 1954, Serial No. 410,180

15 Claims. (Cl. 88—14)

This invention relates to an apparatus for automatically inspecting glass sheets for optical defects that are not readily apparent to an unaided eye.

This application is a continuation of my copending application Serial No. 90,806, filed May 2, 1949, now abandoned.

One common defect in glass sheets is lack of parallelism between the surfaces of the sheet. This defect, known as "wedge," may exist uniformly throughout a sheet of glass or it may exist only in randomly located areas of greater or less extent. If a glass sheet is used as a window and it contains areas exhibiting varying amounts of wedge any object viewed through such a window is distorted in shape and its apparent position does not coincide exactly with its actual position. Ordinarily this effect is not of sufficient magnitude to cause concern. Wedge in the glass, however, shows up if the object being viewed is a bright light source, such as the headlight of an automobile, seen against a dark background. Under this condition a piece of glass exhibiting wedge produces a ghost image that is displaced from the light source an apparent distance that varies according to the amount of wedge (the departure from exact parallelism between the glass surfaces) present in the glass. This ghost image is produced by light rays that, after entering the first surface of the glass are reflected first from the back surface then from the front surface and then emerge through the rear surface. If the two surfaces of glass are precisely parallel (no wedge) the doubly reflected ray and the directly transmitted ray of light are precisely parallel and there is no readily observable difference in position between the apparent position of the object and its actual position.

This defect in the glass sheets may be observed in the laboratory or in an inspection department by setting up similar conditions and looking for the ghost images. This method of inspection is not only tiresome but also time consuming because each small area of the glass must be individually inspected and an estimate made of the amount of wedge existing in such small area.

The principal object of this invention is to provide apparatus for inspecting glass sheets for wedge that permits an entire sheet to be inspected at once and which may be automatic apparatus.

Another object of the invention is to provide inspection apparatus for forming an image of the glass sheet to show those areas exhibiting wedge as spots of light against an otherwise dark background.

Another object of the invention is to provide an automatic inspecting apparatus that detects those sheets of glass exhibiting wedge either in continuous or randomly located areas and which automatically marks such sheets of glass as being optically defective.

A still further object of the invention is to provide an inspecting apparatus capable of classifying sheets of glass according to the maximum amount of wedge existing in any randomly located area within the sheet of glass.

More specific objects and advantages are apparent from the following description of a method of inspection and an automatic inspecting machine operating according to the method.

According to the invention the presence of wedge causing ghost images is detected by observing the deviation caused by refraction of the light passing through the glass. According to the improved method a glass sheet to be inspected is positioned in front of a concave mirror and is illuminated by a brilliant concentrated light source located near the center of curvature of the mirror. An image of the light source as focused by the mirror is received upon a small opaque screen of just sufficient area to intercept all of the undeviated rays of light. If there are areas in the glass being inspected that exhibit wedge, these areas (acting as thin prisms refracting the rays of light) produce deviations of the rays of light both when they pass through the glass going to the mirror as well as when they return from the mirror. The deviations so produced are additive and are sufficient so that the deviated rays of light miss the opaque screen and may be collected in a photoelectric cell for signalling the presence of deviated light rays or may be visually detected. As a further refinement of the method a positive lens is located immediately behind the opaque screen, the lens being of considerably greater area than the screen and serving to collect or concentrate the deviated rays of light onto a detecting element or screen.

As a modification of the invention the positive lens may be arranged to focus an image of the glass being inspected upon a screen, photographic plate or film and such focused image reveals the location of those areas of glass exhibiting wedge because only the light passing through such areas passes the opaque screen and reaches the positive lens. If an indication of the amount of wedge in each area is desired, annular films of graduated density concentric with the opaque screen may be used so that the intensity of light on each element of the image is a measure of the deviation of the ray through that area of the glass.

In a specific embodiment illustrated in the drawings the glass to be inspected is carried on a conveyor past the face of the mirror and inking devices are arranged to mark the glass as long as there are any areas exhibiting wedge in excess of the allowable limit located before the mirror.

The improved method makes it possible without scanning to inspect the full width of the glass or a complete sheet of glass at once because the entire area of glass is illuminated by the point source of light and the light passed through the glass is reflected by the concave mirror the area of which is greater than the area to be inspected. The light passing through acceptable areas is focused onto the opaque screen while the light which is deviated by wedged portions of the glass being inspected passes the screen and signals the presence of defective areas.

The principle of operation of the improved inspection method and an inspection machine designed to operate according to the improved method are illustrated in the accompanying drawings.

In the drawings:

Figure 1 is a diagram of the optical system employed in the improved inspection apparatus.

Figure 2 shows one of the opaque screens and possible locations of the focused light source images.

Figure 3 is a schematic illustration of a modification of the invention wherein a record may be obtained showing the location of the areas of glass exhibiting wedge.

Figure 8 is a section taken along the line 8—8 of Figure 6.

Figure 9 is a fragmentary end elevation of the upper end of the apparatus as seen from the line 9—9 of Figure 5.

Figure 10 is an enlarged side elevation of the light sources and light detecting apparatus located at the upper left end of the inspection machine shown in Figure 5.

Figure 16 is a schematic wiring diagram showing the photoelectric and electrical apparatus for detecting deviated light rays and controlling the ink brushes for marking defective glass.

Figure 5:
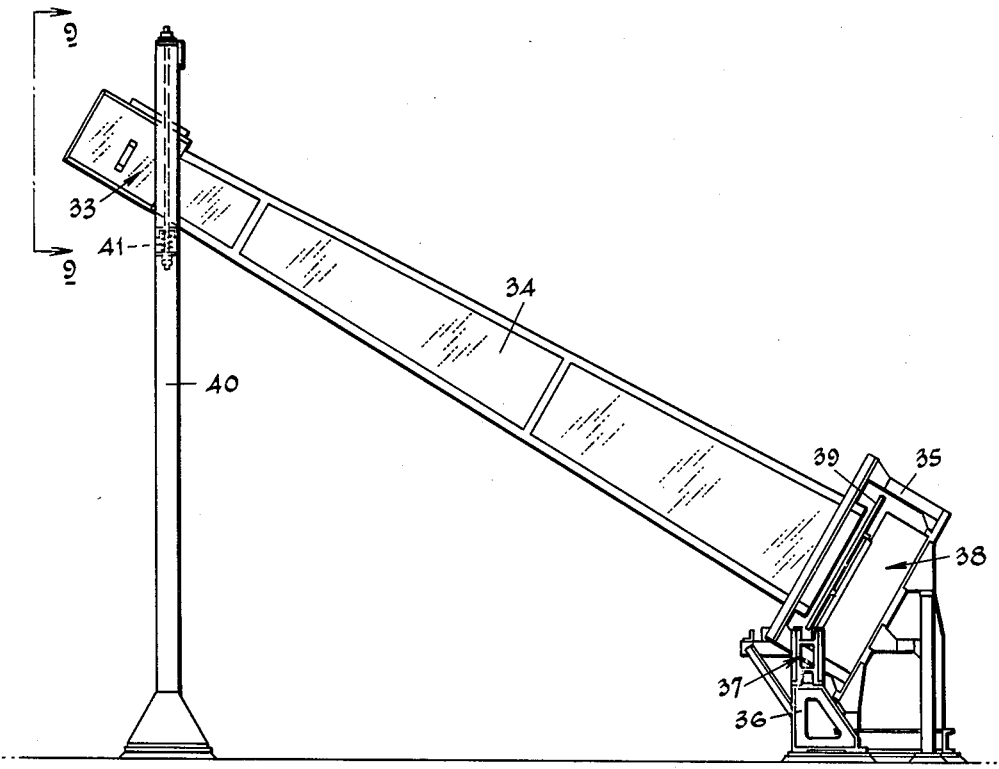
Figure 5 is a side elevation of the complete inspection machine.

These specific figures and the accompanying description are intended to merely illustrate the inspection method and the apparatus and not to limit the scope of the invention.

As was briefly stated the improved method of inspection comprises placing the glass to be inspected in front of a generally concave mirror that is greater in area than the area to be inspected; of illuminating such area by means of a point source of light that is located near the center of curvature of the concave mirror; of focusing the light that is not deviated by the prismatic or wedge defects in the glass being inspected onto a small opaque screen of sufficient area to intercept all of the undeviated light and of detecting any rays of light—the deviated rays—that pass the edges of the opaque screen; and, finally, of classifying the glass according to the presence or absence of deviated rays.

The optical system for accomplishing this result is shown schematically in Figure 1. As there shown a light source 1 which preferably is a small concentrated arc lamp employing a zirconium electrode illuminates a sheet of glass 2 that is being inspected. The light rays after passing through the sheet of glass are reflected from a concave surface 3 of a mirror 4 so that the rays again pass through the glass sheet 2. The reflected rays, because of the curvature of the mirror, are brought to a focus on a small opaque screen 5 that serves to intercept all of the undeviated rays. Thus a light ray 6 proceeding from the light source toward the top edge of the glass sheet 2, as seen in figure, passes through the glass and is reflected as a ray 7 that falls on the opaque screen 5. Likewise, a ray 8 from the light source 1 directed toward the lower portion of the glass sheet 2 is reflected as a ray 9 that also falls on the opaque screen 5. The precise position at which the rays 8 and 9 strike the opaque screen 5 depends upon the amount of deviation produced by the glass sheet 2. For the purpose of example the glass sheet 2 may be assumed to have an area 10 exhibiting wedge so that a light ray 11 in passing through the area 10 is refracted downwardly slightly. This ray 11 after reflection from the mirror returns through the wedged area 10 and is again refracted downwardly as a ray 12 that passes below the opaque screen 5 and through a lens 13 that serves to direct the ray to a light detecting device 14. The light detecting device 14 may be a photoelectric cell or a screen that is observed directly.

In this arrangement it makes no difference which part of the area of the glass is defective as exhibiting wedge since the entire area is illuminated and since any deviated rays will pass the screen 5 and reach the detecting device 14.

Should it be desired to classify the glass according to the amount of wedge into more than merely acceptable and non-acceptable classes, extra light sources such as a light source 15 and extra screens such as a screen 16 may be added. The extra screens may be graduated in size and as shown the screen 16 is considerably larger than the screen 5. Because of the difference in size a considerably greater amount of wedge is required to deviate the rays far enough to pass the screen 16. Thus the screen 5 may be of such area so as to intercept rays having an acceptable limit of deviation while the screen 16 is larger and of sufficient size to intercept those rays passing through areas that have slightly more wedge than is acceptable for certain applications and yet which is acceptable in other applications. However if the glass has an amount of wedge making it unacceptable for either use the deviation is sufficient so that the light rays pass even the larger screen 16.

The possibility of a piece of glass having so much wedge that the light is deviated beyond the limits of the lens 13 or detecting device 14 has also been considered. However this condition while it may exist in small areas of the glass will nevertheless not cause trouble because in the method of manufacturing of the glass it is impossible to have any discontinuities in the surface. Therefore these small excessively wedged areas are in all probability surrounded by areas having lesser amounts of wedge and these lesser amounts produce such deviation that the light reaches the detecting device thereby indicating that the piece of glass is defective.

Figure 2 shows the screen 5 with the image of the light source appearing as a sharply defined spot 17 when the system is properly focused and there is no glass being tested. If the glass sheet being tested is perfect the definition and position of the spot 17 is not changed. If a small precisely constant amount of wedge exists throughout the area of glass the spot 17 is deflected or displaced to a position 18 which may be on the edge of the screen if the amount of wedge corresponds to the critical amount for which the system is designed. If the wedge is still uniform but of greater amount and in the opposite direction the spot 17 may be deflected to a position 19 that is entirely off the screen 5. This may still be within the limits of a larger screen such as the screen 16 cooperating with another light source and light detecting system. If, as is usually the case, sections of the glass sheet 2 exhibit wedge in various amounts an irregularly shaped light spot 20 is formed which for example may have an outline as indicated with the greater portion of the light spot area on the screen 5 but having a small portion extending or spilling over the edge of the screen. This spreading and distortion of the spot 17 to form the distorted spot 20 results because each individual area of glass produces more or less deviation which may or may not correspond to that of other sections of glass and thus produce its own independent effect. The brilliancy of the various portions of the irregular area 20 may be used as a measure of the amount of defective area of glass. Thus if only a very small part of the glass were bad but the amount of wedge in that small area is large enough to be objectionable the pattern on the screen will be very bright near the center of the opaque screen and fading out toward the edge with only a very small amount of light passing into the detecting device.

It is to be understood that the shape of the irregular spot 20 is determined by the amounts and direction of wedge in the various portions of the glass but not by the position of size of such areas. Thus any device that is responsive only to the presence or absence of light passing the screens may sort the glass being inspected according to the maximum amount of wedge occurring in any small area of the glass but is otherwise not capable of directly indicating the location or extent of the defective areas.

Should it be desired to observe or record not only the presence or absence of areas having an excessive amount of wedge but also the location of such area or areas means such as a positive lens 21 (Figure 3) or a concave mirror may be arranged to focus an image of a glass sheet 22 being inspected onto a screen 23. In this arrangement the undeviated rays are intercepted by an opaque center of a screen 24 while the deviated rays that pass through screen 24 are focused by the positive lens 21 so that they fall on the receiving screen 23 in positions corresponding to the sections of glass sheet 22 through which they pass.

The screen 24 may have one or more annular areas of different density so that the amount of deviation of the light ray may be indicated by its intensity. In this arrangement no distinction is made as to the direction of the wedge in the glass because regardless of direction a certain amount of wedge will always produce a certain amount of light on the screen 23 depending on the density of the screen 24. Thus if the wedge is in one direction the light follows a path 25 passing through the upper part of the lens 24 and strikes the screen 23 at a point 26. Similarly if the amount of wedge is the same but the direction is reversed the light follows a path 27 passing through a lower portion of the lens and still strikes the screen 23 at the point 26. Thus the complete image on the screen 23 is a map showing the locations of areas exhibiting wedge existing in the various portions of the glass sheet 22 and according to the graduations in density of the screen 24 showing the amount of wedge in each area.

In an inspection device for recording the location of defective areas in a large number of samples, the samples may be carried on a conveyor so as to pass before a concave mirror of the optical system while a photographic film or plate serving as the screen 23 is moved at a speed equal to the speed of the image formed on the film. Thus, a long strip of film may be used to record the wedge characteristics of a great number of samples of glass.

Figure 4:
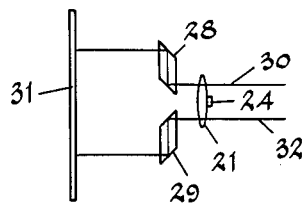
Figure 4 is a fragmentary diagram of a modification of the system shown in Figure 3 to permit the recording of additional information relative to the glass inspected.

If it is desirable in this modification to identify the direction of wedge as well as the location of the areas exhibiting wedge this may be done as shown in Figure 4 by separating the rays passing below the opaque center of the screen from those passing above. This may be done by employing mirrors or prisms 28 and 29 behind the lens 21 so that those areas of glass having wedge that is thicker along the top of the glass produce light rays 30 that after passing through the lens 21 is doubly reflected through the prism 28 to form an image point on the upper half of a screen 31. Thus regardless of the portion of the glass that is exhibiting wedge if such wedge is thicker at the top such a light ray passing through such area will pass above the center of the screen 24 and be recorded in the upper half of the photographic film 31. Likewise, if the direction of wedge is reversed light rays passing through such reversed wedge areas, such as a ray 32, pass below the screen 24 and through the prism 29 so as to strike the lower half of film 31. In this manner two maps of the glass sheet are produced one map showing those areas of the glass having wedge increasing in thickness toward the top and the other map showing those areas of the glass having a wedge increasing in thickness toward the bottom.

As an example of this, suppose a sheet of glass being tested has a relatively large central area free from wedge surrounded by an annular area exhibiting wedge and that in turn surrounded or bordered by another flat area exhibiting no wedge. If such a piece of glass is mapped with the optical arrangement shown in Figure 3 the map shows a circle corresponding to the wedged annular area. However, this map does not disclose whether the central area of glass is thicker or thinner than the marginal area. In the optical arrangement of Figure 4, however, two maps are produced each one showing a semi-circle, i. e., half of the circle appearing on the screen of the first arrangement. If the central area is thicker the semi-circles will appear in certain order on the two maps while if the central area is thinner the semi-circles will appear in reverse order thus providing a means of identifying not only the position of the wedge shaped area but its character as well.

This improved method of inspecting glass sheets for areas exhibiting wedge may be employed in an automatic classifying machine which inspects the glass as it is carried along on a conveyor and marks those sheets of glass having more than a prescribed amount of its area exhibiting more than a critical amount of wedge. Such a machine is illustrated in Figures 5 to 16 inclusive. Referring to Figure 5, suitable light sources and light detecting devices are installed in a light tight box 33 located at the upper end of an inclined tapered light shield 34 the lower end of which is supported in a framework 35 constructed independently of a second framework 36 carrying a conveyor 37. A mirror housing 38 is supported in the framework 35 and glass sheets 39 to be inspected are carried on the conveyor 37 through the space between the end of the light shield 34 and the mirror housing 38. The upper end of the light shield 34 is carried from stanchions 40, small compression springs 41 being employed to minimize the transmission of vibration to the housing 33.

Figures 6, 7:
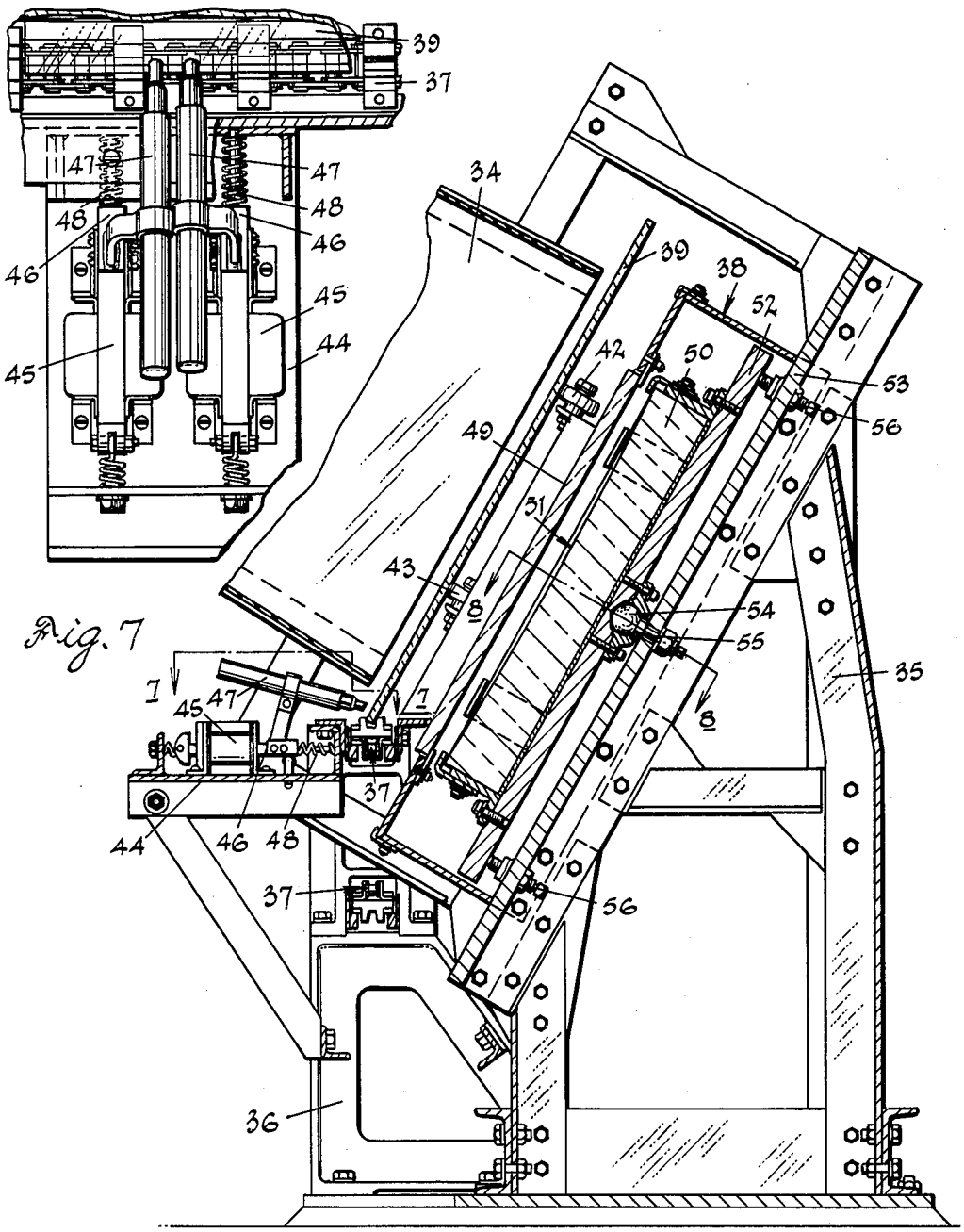
Figure 6 is a vertical section taken perpendicular to the path of a conveyor and showing the relationship between the glass being inspected and the concave mirror.
Figure 7 is a fragmentary plan as seen from the line 7—7 of Figure 6 showing the structure arranged to mark the glass should it exhibit objectionable wedge.

Turning now to Figure 6, which is an enlarged cross section through the mirror housing conveyor and lower end of the light tube, the conveyor includes a chain having a plurality of U-shaped rubber blocks that receive the lower edges of the glass sheets 39 being inspected. Two series of rubber tired rollers 42 and 43 arranged at different elevations along the conveyor 37 guide the glass sheets and hold them in position to be inspected as they pass through the apparatus. The conveyor framework 36 also includes a shelf 44 on which are mounted a pair of solenoids 45 having armatures 46 that actuate inking guns 47. The inking guns are normally held out of engagement with the glass by springs 48 but are urged into marking position whenever the solenoids 45 are energized. The solenoids are controlled by photoelectric means which are sensitive to light rays deviated by wedge shaped areas of the glass sheet 39.

The mirror housing 38 has, in its front wall facing the glass sheet 39, a partially masked clear glass window 49 that has been carefully inspected and found to be free from all traces of wedge or other optical defects. The clear area of the window is arranged to register with the area of the glass to be inspected. Within the housing 38 a large mirror 50 having a concave spherical face 51 is securely mounted on a heavy base plate 52 which in turn is adjustably mounted on a rigid structural member 53 of the framework 35. The mirror base 52 is rockably mounted on a ball and socket joint 54 and heavy bolt 55 secured in the rigid structural member 53. A plurality of adjustable posts 56 contacting the corners at the mirror base plate 52 and threaded through the rigid structural member 53 facilitate precise angular adjustment of the mirror 50 with respect to the light tube 34 and light source within the housing 33. Fig. 5.)

From inspection of Figures 6 and 8 it will be noted that the mirror 50 is much longer in a direction transverse to the conveyor 37 than it is in a direction along the conveyor. This shape is selected since it is necessary that the mirror be long enough to span the height of the glass sheets as they are carried on the conveyor but its width, i. e., its dimension along the travel of the conveyor, need be only great enough so that the photoelectric means and solenoids have time to act while a defective area of glass is being inspected. Thus if the glass is moved very slowly the mirror may be very narrow whereas if the glass is moved rapidly the width of the mirror must be correspondingly increased. This consideration determines the minimum width of the mirror while the cost of the mirror determines its maximum width.

The mirror face is preferably a portion of a spherical surface the center of curvature of which is located approximately in the center of slightly forward of the center of the housing 33 at the upper end of the light shield which housing encloses the light sources and light detecting apparatus. While the mirror theoretically should be a section of an ellipsoid to secure exact focusing when the light source and image are offset from the optical axis the separation of the foci (the positions of the light source and its image) of the ellipsoid is so small that a spherical surface is entirely satisfactory.

The equipment housed within the light source housing 33 is illustrated in Figures 10 to 15 inclusive. Referring to Figure 10 the housing 33 is divided into an upper chamber 57 and a lower chamber 58, the light sources being mounted in the upper chamber 57 and the light detecting equipment being located in the lower chamber 58.

Figure 11:
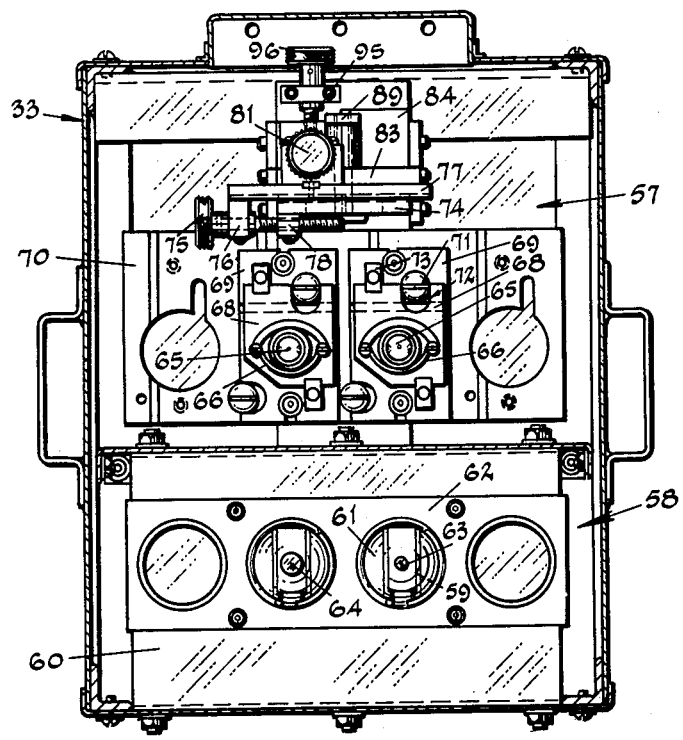
Figure 11 is an elevation looking along the optical axis of the system toward the light sources and light detecting apparatus.
Figure 12:
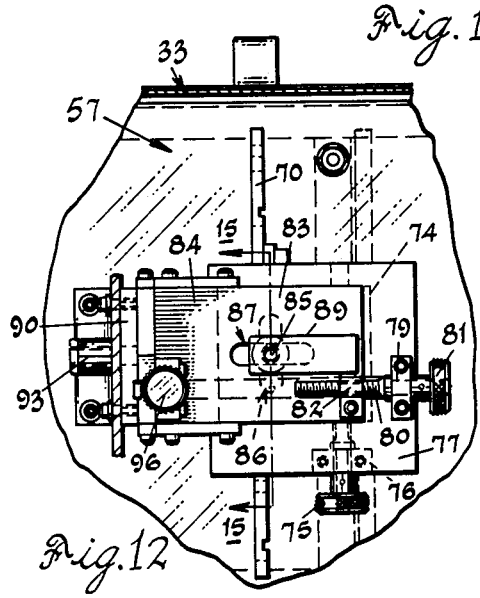
Figure 12 is a fragmentary plan as seen from line 12—12 of Figure 10.

The light detecting equipment comprises one or more photoelectric cells 59 that are mounted behind a partition 60 so that they are completely darkened except for light that enters from the mirror 50 through the light shield tube 34 and lenses 61 covering openings in the partition 60. The lenses 61 correspond in function to the lens 13 of Figure 1 while the photoelectric cells 59 correspond to the light detecting apparatus 14. As a matter of convenience in construction the lenses 61 are mounted in a strip or mounting plate 62 (see also Figure 11) which strip may serve to cover a slot cut in the partition 60 in lieu of an opening or window behind each lens. Figure 11 also shows small opaque screens 63 and 64 centrally located on each of the lenses and arranged to intercept those light rays undergoing less than a critical deviation after twice passing through the glass being inspected and being focused by the mirror 50. These opaque screens 63 and 64 correspond in function to the screens 5 and 16 of Figure 1.

The upper chamber 57 of the housing 33 contains a plurality of arc lamps 65 each of which is supported in a saddle 66 and socket 67 attached to an individual mounting plate 68. The individual mounting plates 68, one for each light source 65, are keyed to and horizontally adjustable on intermediate plates 69 and these intermediate plates are in turn keyed to and vertically adjustable on a gang plate 70. In this construction a tongue in the mounting plate 68 engages a horizontal groove in the intermediate plate 69 and an eccentric stud 71 engaging a slot 72 (Figure 11) serves to adjust the mounting plate 68 horizontally as may be required. A pair of clamps 73 when tightened lock the plates 68 to the intermediate plate 69. A similar arrangement employing a vertical tongue and groove connection as well as clamps serves to support the intermediate plate 69 from the gang plate 70.

The gang plate 70 is carried on a compound carriage arranged so that it might be adjusted along any of three axes. Thus, the gang plate 70 depends from and is rigidly attached to a slide 74 that is mounted for horizontal movement transversely of the optical axis of the system. Adjustment in this direction is controlled by a thumb wheel 75 the screw of which is journaled in a depending lug 76 of a horizontal intermediate plate 77 and threadedly engages a nut 78 attached to the slide 74. The intermediate plate 77 also carries an upwardly extending lug 79 to journal an adjusting screw 80 controlled by a thumb wheel 81. The adjusting screw 80 threadedly engages a nut 82 mounted on a shelf 83 of a vertically adjustable carriage 84. The two adjustments controlled by the thumb wheels 75 and 81 serve to adjust the position of the light sources in a horizontal plane, the thumb screw 75 serving to move the light sources horizontally and perpendicularly to the optical axis while the thumb screw 81 moves them along the optical axis.

Figure 15:
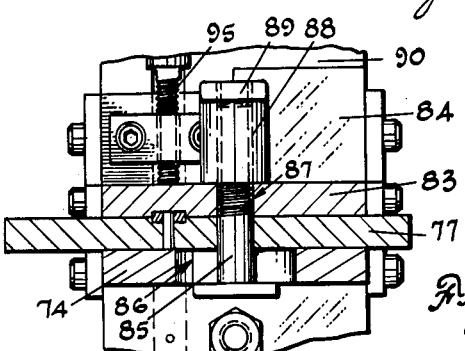
Figure 15 is a fragmentary section taken along the line 15—15 of Figure 12.
Figure 14:
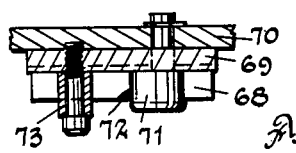
Figure 14 is a fragmentary section taken along the line 14—14 of Figure 10.

Referring to Figure 15 a single clamp comprising a bolt 85 extending upwardly through a slot 86 in the slide 74, through a hole in the intermediate plate 77 and through a slot 87 in the shelf 83 is engaged by a clamping nut 88 having a handle 89. Thus this one clamp serves to lock both horizontal motions.

Figure 13:
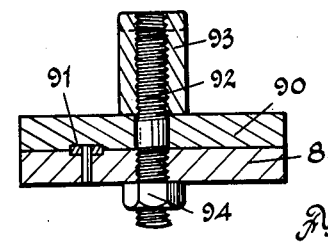
Figure 13 is a fragmentary section of one of the clamping means as seen from the line 13—13 of Figure 10.

The carriage 84 is carried on a vertical plate 90 being guided thereon by a tongue and groove joint 91 (Figure 13). A clamp comprising a bolt 92 threaded into a handle 93 and engaging a nut 94 serves to hold the carriage 84 in whatever position it may be placed by an adjusting screw 95 and a thumb wheel 96.

These various adjustments allow the light source or light sources to be adjusted relative to each other as provided by the individual adjustment plates 68 and 69 and to be adjusted as a group by the adjusting screws thumb wheels 75, 81 and 96.

These adjustments are all required to secure a satisfactory operation of the device since it is necessary that, in the absence of a glass sheet to be inspected, the light from one of the light sources 65 shall be accurately focused on a corresponding opaque screen 63 or 64. Rough adjustment of spot position is obtained by means of the adjusting posts 56 that serve to tilt the mirror 50. Fine adjustment is obtained by moving the light sources horizontally or vertically by means of the thumb wheels 75 and 96 until the spot or spots are accurately located on the centers of the opaque screen or screens 63 or 64. If the spots are not sharply in focus the light sources are moved toward or away from the mirror by manipulation of the adjusting knob 81. If when one of the light spots is accurately focused and located on the center of its particular opaque screen it is found that the other spot or spots are not centered then the light sources producing such other spots are moved relative to the gang plate 70 by means of the individual adjustments until such spots are accurately centered. This latter adjustment is ordinarily not required except after replacement of a light source or light sources. When the light source system is in exact adjustment the light sources are located substantially in line with each other and equally spaced along such line while the lenses 61 are by construction accurately spaced and aligned along a line in the mounting plate 62. The opaque screens are also centered on their respective lenses. Under this condition of adjustment the center of curvature of the mirror 50 is located halfway between the center of a light source and the center of the corresponding screen. Thus in Figure 11 light that is emitted by the left hand light source 65 is received on the small diameter opaque screen 63 located to the right of the vertical center line of the housing while light from the right hand light source is received on the opaque screen 64 to the left of the center line of the housing. Two or more light sources and corresponding photoelectric cells and lenses are employed whenever it is desired to classify the glass sheets according to the maximum degree of wedge existing in the glass and to establish more than two grades in the classification. Thus one light source and photoelectric system is capable of dividing the glass according to the presence or absence of a prescribed degree of wedge while each additional light source and lens may subdivide the non-acceptable class according to the actual amount of wedge present.

Alternatively, one of the possible light source positions and corresponding lens may be employed in an optical system similar to that indicated in Figures 3 and 4 so that not only is the glass classified as it is passed through the machine but also a photographic record is made that indicates the location and type of wedge present in each area of each of the glass sheets being inspected.

In an apparatus employing a photoelectric cell such as one of the cells 59 as the light sensitive element, a very stable electronic amplifier is required to amplify the minute signals corresponding to the presence of light until such amplified signals are capable of actuating a relay for controlling the power to the marker solenoids 45 or to some other device for identifying or classifying the glass sheets. A schematic diagram of a suitable amplifier is illustrated in Figure 16. This diagram shows a regulated power supply and one amplifier channel suitable for operating between one photoelectric cell and one marker solenoid. In the event that more photoelectric cells and light sources are employed duplicate amplifier channels are required, which channels may all be energized from the same power supply.

Referring to Figure 16, in this system direct current power for the light sources 65 is supplied from a direct current source through leads 97 and 98. Since these light sources are arc lamps a stabilizing load resistor 99 is included in series with the light source 65. Where several light sources are employed they may be connected in series with a single stabilizing resistor or they may be connected in parallel each being in series with its own stabilizing resistor.

The amplifier for the photoelectric cells 59 is supplied with alternating current through leads 100 and 101. These alternating current leads are connected to a primary winding 102 of a power transformer 103; to a primary winding 104 of a filament transformer 105; to a primary winding 106 of an isolating transformer 107; and through contacts 108 of a relay 109 are connected to the marker solenoid 45. The power transformer 103 has a high voltage winding 110, a rectifier filament winding 111, and two other filament windings 112 and 113. The high voltage 110 and filament winding 111 supply a full wave rectifier tube 114. The center tap of the high voltage winding 110 is grounded and serves as a negative return for the rectifier. The filament of the rectifier tube 114, which also serves as its cathode, is connected through a resistance-capacitance filter 115 to the anodes of a pair of series regulator tubes 116. The filaments of the regulator tubes 116 are supplied by the filament winding 112 the center tap of which is connected to a lead 117 constituting the regulated high voltage output lead of the power supply.

The grids of the series regulated tubes 116 are connected to the anode of an amplifier tube 118 the cathode of which is connected to the lead 117 through a resistor 119 which supplies current to maintain current flow through a glow discharge tube 120 connected from the tube cathode to a grounded return lead 121 constituting the negative return of the power supply. A series circuit arrangement of a resistor and condenser 122 is connected in parallel with the glow discharge tube 120 to suppress any tendency toward electrical oscillation in this tube. The grids of the amplifier tube 118 are connected to a voltage divider 123 bridging the output of the power supply. The screen grid is connected to a fixed tap on the voltage divider while the control grid is connected to a slider 124 permitting adjustment of the voltage output of the supply. A condenser 125 which may be connected between the control grid of the amplifier tube 118 and either the grounded lead 121 or the regulated high voltage lead 117 suppresses any tendency for the regulator section of the power supply to oscillate.

In this regulator circuit the regulator tubes 116 function as series rheostats in that the voltage drop through these tubes is continually adjusted to compensate for any changes in supply voltage. The amplifier tube 118 is arranged to compare the voltage at its cathode, which is maintained constant by the glow discharge tube 120, with the voltage at its grid which voltage varies in direct proportion to the output voltage and to apply the amplified difference in voltages to the grids of the series control tubes 116.

The amplifier includes one channel for each of the photoelectric cells 59 included in the light detecting section of the inspection apparatus. These channels are all identical and may all be supplied with current from the regulated power supply. Since the channels are similar only one of the channels is shown in the drawings.

The photoelectric cell 59 is energized from the regulated high voltage lead 117 and its cathode is connected through a load resistance 126 to the grounded lead 121. Changes in voltage across the load resistance 126 corresponding to changes in light on the photoelectric cell 59, are applied to a control grid 127 of an amplifier tube 128. Since the current flow through the photoelectric cell 59 is very low and since high sensitivity is desired the resistor 126 has a resistance in the order of 20 megohms and precautions are taken to minimize the leakage resistance to ground of all portions of the leads connecting the cathode of the photoelectric cell to the load resistor 126 and to the grid 127 of the amplifier tube 128.

The amplifier tube 128 is preferably of the high gain type having its suppressor grid connected directly to its cathode 130 and having its screen grid 131 and its cathode 130 tapped onto a voltage divider that is connected from the regulated high voltage lead 117 to the return lead 121. This voltage divider comprises a first resistor 132 connected between the high voltage lead 117 and the screen grid 131; a second resistor 133 connected between the screen grid and the cathode 130 and coarse and fine control rheostats 134 and 135 connected between the cathode 130 and the grounded lead 121. A condenser 136 connected from the cathode 130 to the grounded lead 121 and condenser 137 connected from the screen grid 131 to the grounded lead 121 serve to slightly increase the gain of the amplifier tube 128 with respect to sudden changes in light intensity, and to minimize the response of the amplifier to transient voltages or surges that may occur on the regulated high voltage lead 117.

The amplifier tube 128 has its anode 138 supplied through a plate resistor 139 connected to the regulated high voltage lead 117. The output voltage at the anode 138 is transmitted directly to a control grid 140 of a second amplifier tube 141. This second stage amplifier tube 141 has its screen grid 142 and cathode 143 supplied from taps on a voltage divider 144. In addition a glow discharge tube 145 connected between the cathode 143 and the grounded lead 121 serves to maintain the cathode 143 approximately 105 volts positive with respect to the grounded lead 121 regardless of variations in current drawn through the amplifier tube 141. The amplifier tube 141 has its anode 146 connected to the regulated high voltage lead 117 through a load resistor 147. The anode 146 is also directly connected to a control grid 148 of a screen grid thyratron tube 149. The thyratron 149 has its cathode 150 connected to the screen grid tap of the voltage divider 144. Thus as long as the second stage amplifier tube has its anode 146 at the same potential as its screen 142 there is no difference in potential between the grid and cathode of the thyratron tube 149.

The thyratron tube has its filament 151 tied to its cathode 150 and supplied from the filament transformer 105. Its cathode 150 is also connected through a lead 152 to a secondary winding 153 of the isolation transformer 107, the other terminal of which is connected to a lead 154 leading to the coil of the relay 109. The other side of the relay coil is connected through a current limiting resistor 155 to an anode 156 of the thyratron tube 149. The thyratron tube thus serves as a grid controlled half-wave rectifier to permit current to flow through the relay 109 as long as the anode 146 of the amplifier tube 141 is substantially equal in potential to or positive with respect to its screen grid 142. A condenser 157 connected in parallel with the coil of the relay 109 acts as a filter to smooth out the halfwave impulses of current and prevent chattering of the relay.

In the operation of this circuit whenever a defective piece of glass, i. e., one exhibiting more than a predetermined acceptable amount of wedge, is being inspected more or less light falls on the photoelectric cell 59, the amount depending upon the area of the glass that is defective, and the photoelectric cell 59 thereupon passes current in proportion to the light received. This current flowing through the load resistor 126 produces a positive increment of voltage at the control grid 127 of the first amplifier tube 128. The resulting increase in current flow through the amplifier tube 128 causes a negative increment of voltage at its anode which when amplified through the second amplifier tube 141 produces a positive increment of voltage at the control grid 148 of the thyratron tube 149. This causes the thyratron tube to pass current to energize the relay 109, which in turn energizes the marker solenoid 45 bringing its marker gun 47 into contact with the glass thereby marking the glass in line with the defective area.

The sensitivity of the circuit is maintained as high as possible consistent with stability and the dividing line between an acceptable glass sheet and an unacceptable sheet is determined by the adjustment of the coarse and fine control rheostats 134 and 135. The adjustment of these rheostats varies the potential of the cathode 130 with respect to the grounded lead 121 and thus determines the current flow that must exist through the photoelectric cell 59 before the marking mechanism is actuated.

In an actual inspection machine constructed according to the invention the sensitivity is such that an area of approximately one square inch out of a total inspected area of fifty to sixty square inches or more will cause a response and a marking of the glass.

The speed of response of the automatic inspecting equipment is sufficiently great that the limiting factor determining the rate of operation of the machine is the time required to load the glass sheets onto the conveyor and to remove the inspected sheets from the conveyor. A reasonable speed of conveyor operation may be in the order of three feet per second and at this speed an element of glass is in the inspecting zone approximately one-fifth to one-tenth of a second. As far as the amplifier is concerned the limiting factor is that the defective area of the glass sheet must be within the inspecting zone two or three cycles of the supply voltage—approximately one-twentieth of a second—so that the relay 109 and the solenoid 45 may have time to operate.

Should it be desired to operate at a higher conveyor speed the mirror 50 may be increased in width in the direction of travel of the glass so as to maintain approximately constant time interval during which each element of glass is in the inspection zone. It is also possible by the use of direct current on the relay system or by using a higher frequency power supply for the relay system to reduce the time interval required to energize the marker solenoid 45.

The improved inspection method and apparatus using the prismatic effect of wedged glass producing deviation of light rays permits the economical and accurate inspection of glass to detect and identify those glass sheets which if installed as a window or windshield would produce annoying ghost images of light sources viewed through the glass.

Various modifications in details of constructions may be made without departing from the spirit and scope of the invention.

We claim:

1. In an apparatus for inspecting glass sheets for wedge effects producing deviations of light rays passing therethrough, in combination, means for conveying glass sheets along a definite path, a concave mirror behind but adjacent to and facing said conveying means, a point source of light in front of and spaced from said conveying means for illuminating the mirror, an opaque screen of limited area located at the image plane of the mirror and laterally of said source of light for intercepting light rays that are undeviated by glass sheets on said conveying means, and a photoelectric device for receiving light reflected from the mirror that is deviated by said glass and passes the screen.

2. In an apparatus for inspecting glass sheets to detect the presence of randomly located areas exhibiting wedge effects, in combination, means for supporting a glass sheet to be inspected, a concave mirror having an area at least equal to the area to be inspected at any instant positioned behind but adjacent to and facing said support, a point source of light in front of and spaced from said support for illuminating the mirror, a lens located with its front face near the image plane of the mirror and laterally of said source of light to receive light reflected from the mirror, a photoelectric device near the focal plane of the lens for detecting light from the mirror, and an opaque screen mounted in the image plane of the mirror to intercept rays of light that are not deviated by said glass sheet.

3. In an apparatus for inspecting glass sheets to detect the presence of randomly located areas exhibiting wedge effects; in combination, means for conveying glass sheets along a definite path, a section of a concave mirror behind but adjacent to and facing said path and having a length at least equal to the width of the areas of the sheets of glass to be inspected, a point source of light in front of said path, a small opaque screen at the image point of the light as focused by the mirror and laterally of said source of light, said screen serving to intercept all rays undergoing an acceptable deviation by said glass sheets, and a photoelectric device exposed to light rays passing the screen for signalling the presence of unacceptable deviation by said glass sheets.

4. In a device for inspecting glass sheets for the presence of randomly located areas exhibiting wedge, in combination, a support for a glass sheet to be inspected, a point source of light in front of said sheet for illuminating the same, light reflecting and focusing means located in the light path behind and adjacent the glass being inspected for forming a focused real image of the light source, an opaque screen positioned to receive the focused real image and having dimensions corresponding to said real image focused thereon as a result of an acceptable amount of wedge, means for detecting light rays of said image that fall outside the area of the screen as a result of an unacceptable amount of wedge, and means responsive to the light detecting means for signalling the presence of said unacceptable amount of wedge.

5. In a device for inspecting glass sheets for the presence of randomly located areas exhibiting wedge, in combination, a conveyor for carrying the glass, a point source of light in front of said conveyor for illuminating an area in the plane of the glass carried on the conveyor, light reflecting and focusing means located behind the illuminated area of the glass being inspected for reflecting the transmitted light back through the glass and forming a focused real image of the light source, an opaque screen at the image plane for intercepting undeviated rays of light, and a photocell behind said screen for detecting rays of light deviated by passage through glass areas exhibiting wedge.

6. In a device for inspecting glass sheets for wedge, in combination, a conveyor for carrying the glass, a point source of light in front of said conveyor for illuminating an area in the plane of the glass on the conveyor, light reflecting and focusing means behind the conveyor for reflecting transmitted light back through the glass and for forming a real image of the light source, a mask interposed in the light path to limit the light to those areas to be inspected, an opaque screen in the image plane of the mirror, the screen being of a size just sufficient to intercept all light rays having a predetermined deviation, and a photocell behind the screen for detecting rays of light deviated more than the predetermined amount by their passage through areas of the glass sheets exhibiting wedge.

7. In a device for inspecting glass sheets for the presence of randomly located areas exhibiting wedge, in combination, means for supporting a sheet of glass to be inspected, a point source of light for illuminating the area of glass to be inspected, light reflecting and focusing means behind said area for reflecting transmitted light back through the glass to form an image of the light source, an opaque screen of sufficient area at the image plane to intercept all rays having a predetermined deviation, a lens of greater area than the screen located behind the screen for combining the rays having more than the predetermined deviation to form a real image of the area being inspected, and a screen for receiving the real image of the area on which screen the areas exhibiting wedge are shown as illuminated image areas.

8. In a device for classifying glass sheets according to the amount of wedge existing in randomly located areas, in combination, a support for a sheet of glass to be inspected, a plurality of point sources of light in front of the glass on said support for illuminating the same, a concave mirror located behind the glass for reflecting transmitted light and forming real images of the light sources, a plurality of screens one for each image, said screens being of graduated sizes each large enough to intercept all rays having no more than a predetermined deviation, and photoelectric means behind each of the screens for detecting light rays passing the screens.

9. In a device for classifying glass sheets according to the amount of wedge existing in randomly located areas, in combination, a moving support for a sheet of glass to be classified, a plurality of point sources of light in front of the glass on said support, a concave mirror located behind the glass for reflecting and focusing the light to form images of the light sources, a plurality of opaque screens, said images being focused on the screens, each screen being of sufficient area to receive the image as distorted by areas of glass having no more than prescribed amounts of wedge, a photoelectric device behind each screen to detect light that is deviated beyond the boundary of the cooperating screen, and marking apparatus controlled by the photoelectric device to mark the glass containing detected areas of wedge.

10. In a device for inspecting glass sheets for the presence of randomly located areas exhibiting wedge, in combination, means for supporting a sheet of glass to be inspected, a point source of light in front of the glass on said support for illuminating the same, first focusing means behind the glass on said support for collecting the light transmitted through the glass to form a real image of the light source, a screen having at least an opaque central section for receiving the focused real image, second focusing means located behind said screen for forming a real image of the glass area being inspected, and light sensitive recording means for recording the image of the inspected area.

11. In a device for inspecting glass sheets for the presence of randomly located areas exhibiting wedge, in combination, a support for glass sheets to be inspected, a point source of light in front of the glass sheets on said support for illuminating the same, first focusing means behind the glass on said support for collecting the light transmitted through the glass to form a real image of the light source, a screen having at least an opaque center for receiving the focused light source image, second focusing means located behind the screen for collecting deviated rays and forming a real image of the glass being inspected, means for separating light rays passing through one section of said screen from those passing through another section whereby said second focusing means forms a plurality of images of the wedged area of the glass affording an indication of the direction of wedge in the glass and a light sensitive element for receiving the plurality of images.

12. In a device for inspecting glass sheets for the presence of randomly located areas exhibiting wedge, in combination, a support for the glass to be inspected, a point source of light in front of said support for illuminating an area in the plane of the glass on the support, light reflecting and focusing means located behind the illuminated area of the glass being inspected for reflecting the transmitted light back through the glass and forming a focused real image of the light source, a screen at the image plane for intercepting undeviated rays of light, light responsive means adjacent the screen for receiving deviated rays of light and emitting a signal upon receipt thereof, and means responsive to said signal for marking the glass containing detected areas of wedge.

13. In a device for inspecting glass sheets for the presence of randomly located areas exhibiting wedge, in combination, a support for a glass sheet to be inspected, a point source of light in front of said sheet for illuminating the same, light reflecting and focusing means located in the light path behind and adjacent the glass being inspected for forming a focused real image of the light source, a screen having at least an opaque central section positioned to receive the focused real image and serving to intercept all rays undergoing an acceptable deviation by said glass sheet, and light responsive means adjacent the screen for receiving deviated rays of light not striking the screen and signalling the receipt thereof.

14. In a device for inspecting glass sheets for the presence of randomly located areas exhibiting wedge, in combination, a support for a glass sheet to be inspected, a point source of light in front of said sheet for illuminating the same, light reflecting and focusing means located in the light path behind and adjacent the glass being inspected for forming a focused real image of the light source, a screen having at least an opaque central section positioned to receive the focused real image and serving to intercept all rays undergoing an acceptable deviation by said glass sheet, and a photoelectric device for detecting light rays of said image that fall outside the area of the screen as a result of an unacceptable amount of wedge, and means responsive to said photoelectric device for marking the glass containing detected areas of wedge.

15. In a device for inspecting glass sheets for the presence of areas therein exhibiting wedge, in combination, a support for a glass sheet to be inspected, a point source of light, a lens for passing light rays from said source through the glass sheet and focusing said rays to form a real image of the light source, a screen substantially at the image plane of said lens for intercepting light rays from said lens which undergo an acceptable degree of deviation after passing through the glass, light responsive means beyond the screen for receiving deviated light rays which pass the screen and signalling the presence thereof, and marking apparatus responsive to signals emitted by the light responsive means for marking the glass upon receipt of said signals.

References Cited in the file of this patent

UNITED STATES PATENTS

| 2,231,170 | Lindenblad | Feb. 11, 1941 |
| 2,424,976 | Golay et al. | Aug. 5, 1947 |

FOREIGN PATENTS

| 888,644 | France | Sept. 13, 1943 |

OTHER REFERENCES

Moffit, G. W.: "An Instrument for the Testing of Prisms," Journal of the Optical Society of America, vol. 7, pages 831–852, October 1923, pages 839 and 840 cited.